United States Patent
Nasini et al.

(10) Patent No.: US 12,228,095 B2
(45) Date of Patent: Feb. 18, 2025

(54) WASTE HEAT RECOVERY SYSTEM AS A BACKUP SYSTEM FOR A MACHINE FOR THE PRODUCTION OF ENERGY

(71) Applicant: NUOVO PIGNONE TECNOLOGIE—SRL, Florence (IT)

(72) Inventors: Ernesto Nasini, Florence (IT); Marco Santini, Florence (IT)

(73) Assignee: Nuovo Pignone Technologie—SRL, Florence (IT)

( * ) Notice: Subject to any disclaimer, the term of this patent is extended or adjusted under 35 U.S.C. 154(b) by 0 days.

(21) Appl. No.: 18/003,838

(22) PCT Filed: Jun. 30, 2021

(86) PCT No.: PCT/EP2021/025242
§ 371 (c)(1),
(2) Date: Dec. 29, 2022

(87) PCT Pub. No.: WO2022/002441
PCT Pub. Date: Jan. 6, 2022

(65) Prior Publication Data
US 2023/0258146 A1    Aug. 17, 2023

(30) Foreign Application Priority Data
Jul. 3, 2020    (IT) .................... 102020000016090

(51) Int. Cl.
*F02G 5/02*    (2006.01)
(52) U.S. Cl.
CPC ..................... *F02G 5/02* (2013.01)

(58) Field of Classification Search
CPC ..... F02G 5/02; F02G 5/04; F02G 5/00; F02G 1/055; F02G 2260/00; F02G 2254/15;
(Continued)

(56) References Cited

U.S. PATENT DOCUMENTS 5,284,016 A * 2/1994 Stark .................... F01N 9/00
60/303
9,587,520 B2 * 3/2017 Huck .................... F01K 19/10
(Continued)

FOREIGN PATENT DOCUMENTS

| EP | 3051111 A1 | 8/2016 |
|---|---|---|
| JP | 2009228475 A | 10/2009 |
| JP | 2011148399 A | 8/2011 |

*Primary Examiner* — Dapinder Singh
(74) *Attorney, Agent, or Firm* — Paul Frank + Collins P.C.

(57) ABSTRACT

The disclosure concerns a waste heat recovery system that is configured to operate as a prime mover in emergency case, when the heat source is down. The waste heat recovery system comprises, in addition to a heater configured to circulate a working fluid in heat exchange relationship with a heating fluid from the heat source to heat the working fluid, an independent auxiliary heat source configured to provide an additional heating fluid in heat exchange relationship with the working fluid, to heat the working fluid. The system is provided with a secondary heater, which is configured to circulate the working fluid in heat exchange relationship with the additional heating fluid from the independent auxiliary heat source and which can be used to replace the heater or in combination with the heater.

12 Claims, 1 Drawing Sheet

(58) Field of Classification Search
CPC ...... F02G 2262/00; F01K 23/06; F01K 23/10; F01K 23/065; F01K 13/006; F01K 3/18; F01K 27/02; F01D 15/10; Y02T 10/12; Y02T 10/40; Y02A 30/274; Y02A 30/27

See application file for complete search history.

(56) References Cited

U.S. PATENT DOCUMENTS

| | | |
|---|---|---|
| 2004/0020206 A1 | 2/2004 | Sullivan et al. |
| 2014/0352307 A1* | 12/2014 | Lehar ............... F01K 23/10 60/647 |
| 2016/0169079 A1* | 6/2016 | Zhou ............... F01P 3/2271 60/670 |
| 2016/0273407 A1 | 9/2016 | Ekanayake et al. |
| 2020/0191021 A1* | 6/2020 | Santini ............... F01K 15/00 |
| 2021/0363900 A1* | 11/2021 | Nasini ............... F02C 1/10 |

\* cited by examiner

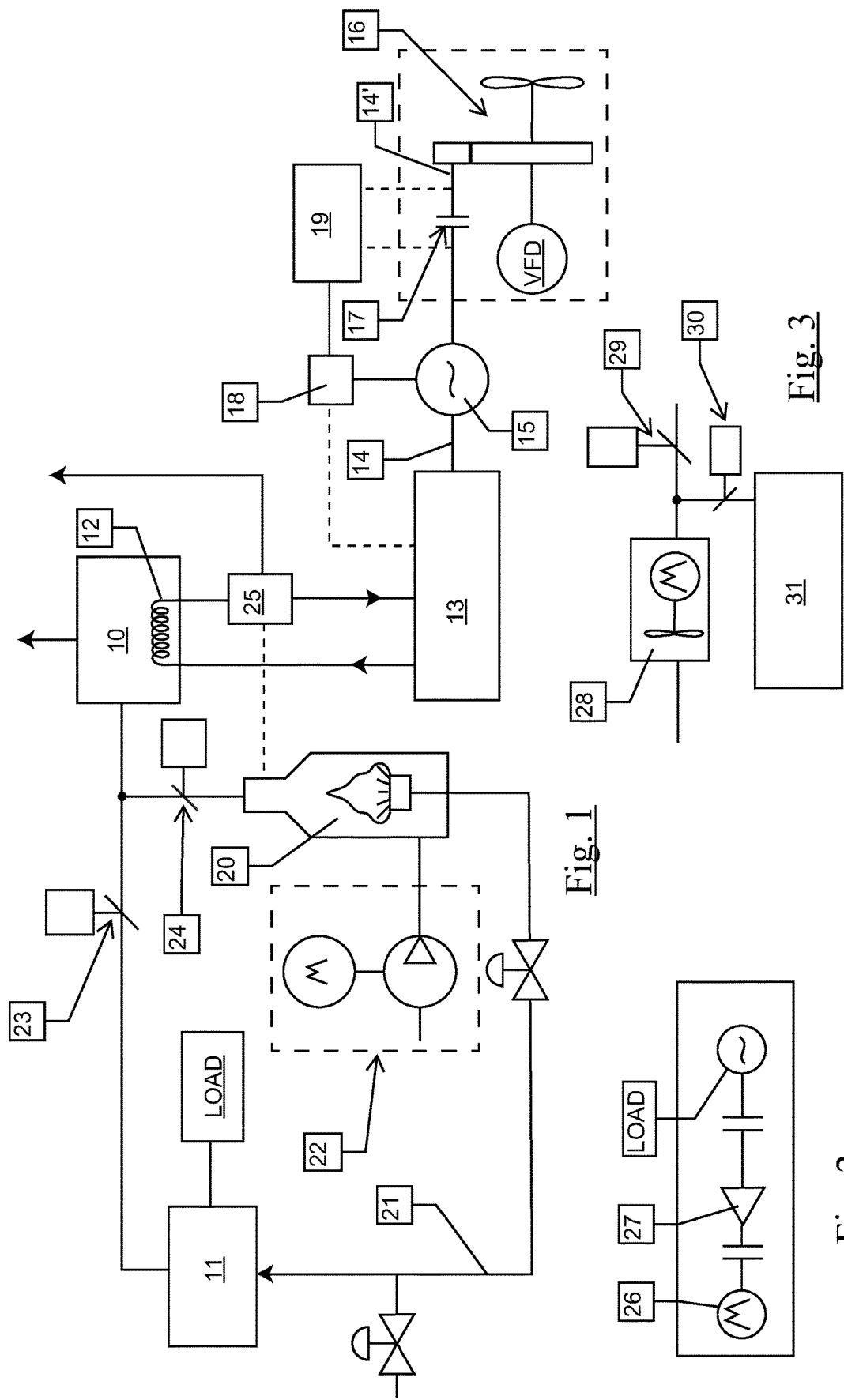

WASTE HEAT RECOVERY SYSTEM AS A BACKUP SYSTEM FOR A MACHINE FOR THE PRODUCTION OF ENERGY

TECHNICAL FIELD

The present disclosure concerns an improved backup system for a machine for the production of energy, the backup system being based on a waste heat recovery system to be used as an emergency source of energy. Embodiments disclosed herein specifically concern improved thermodynamic machines such as gas turbines and/or engine generators or mechanical drive stations, wherein a waste heat recovery system is configured to act as a prime mover in case of need.

BACKGROUND ART

In order to avoid the drawbacks due to a possible shutdown, energy producing machines can be provided with a backup power unit, such as an auxiliary engine. However, this solution is expensive and adds complexity to the system. Furthermore, the additional weight of the backup power unit can be undesirable in many cases.

Thermodynamic systems, where a working fluid is processed in a closed circuit and undergoes thermodynamic transformations eventually comprising phase transitions between a liquid state and a vapor or gaseous state, are typically used to convert heat into useful work, and in particular into mechanical work and/or into electric energy. Conveniently, these systems can also be used to recover waste heat of different kinds of machines. In fact, the remaining heat of a machine, such as a thermodynamic system, i.e. the heat discharged by the system eventually along with a portion of the heat source not exploited by the system, often is still sufficiently high and may be validly converted into mechanical energy using a thermodynamic cycle.

Typically, the waste heat source can include combustion engines, gas turbines, geothermal, solar thermal, industrial and residential heat sources, or the like. The waste heat recovery system typically include the expansion unit/group and the compression unit/group of a Brayton cycle system and/or a Stirling cycle system and/or the expansion unit/group of a Rankine cycle system. The shaft of the waste heat recovery system is typically directly coupled with an external appliance, such as a generator.

However, in case of shutdown of the waste heat source, waste heat recovery systems are useless, since they are also stopped as a consequence of the cooling down of the system.

SUMMARY

According to the present invention, it is proposed that waste heat recovery systems are provided with an independent auxiliary heat source, allowing the waste heat recovery systems to be used as a prime mover, rather than as a bottom cycle, in case of shutdown of the waste heat source.

Thus, in one aspect, the subject matter disclosed herein is directed to a waste heat recovery cycle system and related method in which a burner is provided to generate heat to be used by the waste heat recovery system in case of shutdown of the main waste heat source. Heat from the burner is converted by the waste heat recovery system into mechanical power for electricity generation and/or mechanical application such as the driving of pumps or compressors.

Additionally, in another aspect, the subject matter disclosed herein is directed to a waste heat recovery cycle system and related method in which a burner is provided to generate heat to be used by the waste heat recovery system in addition to the heat from the main waste heat source, in particular in case where peak power demand is required.

According to still another aspect, the subject matter disclosed herein is particularly viable for marine applications, since it make the installation of an additional emergency system useless, thus avoiding the need to add further weight and footprint, which is very important in this field.

Thus, the subject matter disclosed herein is directed to a new waste heat recovery cycle system and to a related method of operating the same, wherein, in case of shutdown of the waste heat source, the waste heat recovery system can operate independently, to generate mechanical power for electricity generation and/or mechanical application by converting the heat provided by an independent auxiliary heat source.

This configuration allows to avoid the need for considerable capital and operative expenditures to provide a machine with a backup power unit, by proposing a solution which is very simple and accordingly very cost effective.

BRIEF DESCRIPTION OF THE DRAWINGS

A more complete appreciation of the disclosed embodiments of the invention and many of the attended advantages thereof will be readily obtained as the same becomes better understood by reference to the following detailed description when considered in connection with the accompanying drawings, wherein:

FIG. 1 illustrates a schematic of a new, improved waste heat recovery system combined with an auxiliary burner;

FIG. 2 illustrates a schematic of a first variant of the system of FIG. 1; and

FIG. 3 illustrates a schematic of a second variant of the system of FIG. 1.

DETAILED DESCRIPTION OF EMBODIMENTS

According to one aspect, the present subject matter is directed to a waste heat recovery system wherein a burner is provided as an auxiliary heat source, independent from a main waste heat source, generating hot exhaust gases exchanging heat with the working fluid of the waste heat recovery system. The burner size is dependent on the heat needed in emergency conditions.

According to another aspect, the burner is fed by the same fuel feeding line of the waste heat source and is provided with a blower for air inlet.

According to still another aspect, air to be mixed with the fuel in the burner is conveyed by a blower that is fed by a battery as a starter and by a generator connected to the waste heat recovery system for the steady state operation. Alternatively, air is conveyed to the burner by the cooling ventilation system of the waste heat source, which is only partly needed in case of shutdown of the waste heat source. In particular, since the fans of the cooling ventilation systems usually have energy-absorbing engines, a variable frequency drive can be used to make a battery powered starting of the fan easier, by lowering the speed of the fan, and consequently the flow rate and power. Additionally, by lowering the flow rate and power need, load and footprint are also lowered, which is very important in case of marine applications. In case the waste heat source is a thermodynamic system comprising a turbine and a compressor, air is conveyed to the burner by the starter of the turbine.

According to still another aspect, the hot exhaust gases of the burner are conveyed alternatively:
- to the same heat exchanger of the fumes of the waste heat source, the gas conveying lines of both the burner and the waste heat source being provided with dampers to avoid the gases from the waste heat source can flood the burner when the latter is stopped and vice versa;
- to a smaller heat exchanger, separated from the heat exchanger of the fumes of the waste heat source, in case the heat needed in emergency conditions is much lower than the heat from the waste heat source;
- both to the same heat exchanger of the fumes of the waste heat source and to a separate smaller heat exchanger, to allow the system to rapidly respond in case of peak power demand.

According to another aspect, the waste heat recovery system based backup system disclosed herein can be conveniently used in a plurality of applications: from marine applications to gas turbines and combustion engines. In case of marine applications, where the presence of an emergency engine is always needed, the use of a waste heat recovery system as a backup system allows to replace the emergency engine, thus optimizing capital expenditures and operating expenses, and also footprint and weight of the whole propulsion system. Moreover, in case the waste heat recovery system used as backup system is a low speed system, such as a system operating according to a Brayton cycle with $CO_2$ as working fluid, in addition to the production of electric energy the backup system can also be used in a hybrid configuration, by means of a clutch, being directly or indirectly (through a gear unit) connected to the propeller shaft. In such a way, the waste heat recovery system operating as a backup system is also capable of providing mechanical energy to the propeller even in case of a shutdown of a ship main engine, thus increasing the mission reliability of the whole system. Such a hybrid configuration is conveniently provided with a variable-frequency drive generator so to be capable of producing electric energy according to the power that is not absorbed by the propeller.

Referring now to the drawing, FIG. 1 shows a new waste heat recovery system, which is illustrated in accordance with an exemplary embodiment of the invention.

Referring to FIG. 1, a heater 10 is coupled to a heat source 11, for example an exhaust unit of a heat generation system (for example, an engine). In operation, the heater 10 receives heat from a heating fluid e.g. an exhaust gas generated from the heat source 11, which warms an inert gas passing through a tube bundle 12 coupled with the heater 10. In a first exemplary embodiment, the inert gas exiting from the heater 10 flows to and thorough a waste heat recovery system 13, configured as a thermodynamic system comprising a shaft 14, which is configured to drive a generator, preferably a VFD type generator 15, which generates electric power and is connected through a shaft extension 14' to a marine propeller 16, through a clutch 17, according to a hybrid configuration. Such hybrid configuration also comprises a variable-frequency drive control panel 18 to regulate the production of electric power according to the propeller energy absorption and/or according to the electric load requirements, whichever is set as the master. Such hybrid configuration also comprises a clutch control system 19, to regulate the clutch so to couple the shaft 14 and the shaft extension 14' only when the relative speed rates are similar.

A burner 20 is additionally coupled with the heater 10. Fuel is fed to the burner 20 by a fuel feeding line 21, while air is fed by a blower 22. In operation, the exhaust gases from the burner 20 are conveyed to the heater 10. By way of illustration and not limitation, the fuel feeding line 21 is the same for the burner 20 and the heat source 11.

The flowing of exhaust gas from the heat source to the heater 10 is regulated by a first damper 23 while the flowing of exhaust gas from the burner 20 to the heater 10 is regulated by a second damper 24.

In one specific embodiment, an additional heater 25 is configured to replace the heater 10 and is optimized to exchange a heat amount provided by the burner 20 being much lower than the heat provided by the heat source 11 in normal operation.

In an embodiment, the heater 10 and the additional heater 25 are configured to operate simultaneously, to allow the system to rapidly respond in case of peak power demand.

In an exemplary embodiment of the system, when the heat source 11 is a thermodynamic system comprising a turbine and a compressor, the blower 22 is replaced by a starter 26 of the turbine 27, as is shown with reference to FIG. 2.

In yet another exemplary embodiment of the system, air is fed to the burner 20 by the ventilation system 28 of the heat source 11. Dampers 29, 30 are configured to control air conveyed to the heat source enclosure 31 and to the burner 20, as is shown with reference to FIG. 3.

While aspects of the invention have been described in terms of various specific embodiments, it will be apparent to those of ordinary skill in the art that many modifications, changes, and omissions are possible without departing form the spirt and scope of the claims.

The invention claimed is:

1. A waste heat recovery system, comprising:
a heater configured to circulate a working fluid in heat exchange relationship with a heating fluid from a heat source to heat the working fluid, the working fluid being processed in a closed circuit and undergoing thermodynamic transformations to convert heat into useful work;
an independent auxiliary heat source configured to provide an additional heating fluid in heat exchange relationship with the working fluid to heat the working fluid,
wherein a secondary heater is used to replace the heater and is configured to circulate the working fluid in heat exchange relationship with the additional heating fluid from the independent auxiliary heat source.

2. The system according to claim 1, further comprising:
a fuel feeding line of the heat source is configured to feed fuel to the independent auxiliary heat source.

3. The system according to claim 1, further comprising:
a blower is configured to feed air to the independent auxiliary heat source.

4. The system according to claim 1, further comprising:
an air feeding line of the heat source is configured to feed air to the independent auxiliary heat source.

5. The system according to claim 1, further comprising:
a cooling ventilation system of the heat source is configured to feed air to the independent auxiliary heat source.

6. The system according to claim 1, further comprising:
a shaft is configured to be operated by the waste heat recovery system.

7. The system according to claim 6, wherein the shaft is directly coupled with an external appliance.

8. The system according to claim 7, wherein the external appliance is a generator.

9. The system according to claim 8, wherein the generator is connected to a marine propeller, through a shaft extension, which is coupled to the shaft by a clutch, the clutch being operated by a clutch control system.

10. The system according to claim 1, further comprising:
a shaft; and
a VFD type generator coupled to the shaft.

11. The system according to claim 1, further comprising:
a shaft;
a VFD type generator coupled to the shaft; and
a variable-frequency drive control panel coupled to the VFD type generator.

12. The system according to claim 1, further comprising:
a tube bundle coupled to the heater.

* * * * *